(12) United States Patent
Suzuki et al.

(10) Patent No.: US 11,860,480 B2
(45) Date of Patent: Jan. 2, 2024

(54) LIQUID CRYSTAL DISPLAY DEVICE

(71) Applicant: FUJIFILM Corporation, Tokyo (JP)

(72) Inventors: Masaaki Suzuki, Kanagawa (JP);
Tatsuya Iwasaki, Kanagawa (JP);
Katsufumi Ohmuro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/180,598

(22) Filed: Mar. 8, 2023

(65) Prior Publication Data

US 2023/0221600 A1 Jul. 13, 2023

Related U.S. Application Data

(63) Continuation of application No. PCT/JP2021/032655, filed on Sep. 6, 2021.

(30) Foreign Application Priority Data

Sep. 11, 2020 (JP) .................. 2020-152570

(51) Int. Cl.
*G02F 1/13363* (2006.01)
*G02F 1/1335* (2006.01)
(Continued)

(52) U.S. Cl.
CPC ...... *G02F 1/133638* (2021.01); *G02F 1/1323* (2013.01); *G02F 1/133531* (2021.01); *G02F 1/133603* (2013.01)

(58) Field of Classification Search
CPC ......... G02F 1/133638; G02F 1/133531; G02F 1/1323; G02F 1/133603; G02F 1/13363; G02F 1/133631
See application file for complete search history.

(56) References Cited

U.S. PATENT DOCUMENTS

| 2007/0091588 | A1 | 4/2007 | Hwang |
| 2007/0242188 | A1 | 10/2007 | Sakai |
| 2015/0205157 | A1* | 7/2015 | Sakai .................. G02F 1/13363 349/62 |

FOREIGN PATENT DOCUMENTS

| JP | 2007-123250 A | 5/2007 |
| JP | 2011-197409 A | 10/2011 |

(Continued)

OTHER PUBLICATIONS

International Search Report issued in PCT/JP2021/032655 dated Oct. 26, 2021.

(Continued)

*Primary Examiner* — Edward J Glick
*Assistant Examiner* — David Y Chung
(74) *Attorney, Agent, or Firm* — Edwards Neils LLC; Jean C. Edwards, Esq.

(57) ABSTRACT

The present invention provides a liquid crystal display device having excellent display quality and suppressed occurrence of halo. The liquid crystal display device of the present invention is a liquid crystal display device including, in the following order, a first polarizer, a liquid crystal cell, a second polarizer, and a direct type backlight that uses a point light source, in which a light control member is further provided between the second polarizer and the direct type backlight, and the liquid crystal display device satisfies relationships of the following Expression (1) 70%≤(I20/I0)×100≤90%, Expression (2) 10%≤(I40/I0)×100≤35%, and Expression (3) 1%≤(I60/I0)×100≤20%.

16 Claims, 4 Drawing Sheets

(51) Int. Cl.
  *G02F 1/13* (2006.01)
  *G02F 1/13357* (2006.01)

(56) References Cited

FOREIGN PATENT DOCUMENTS

| | | |
|---|---|---|
| WO | 2006/001448 A1 | 1/2006 |
| WO | 2014/034481 A1 | 3/2014 |
| WO | 2017/022800 A1 | 2/2017 |
| WO | 2019/045098 A1 | 3/2019 |

OTHER PUBLICATIONS

Written Opinion issued in PCT/JP2021/032655 dated Oct. 26, 2021.
International Preliminary Report on Patentability completed by WIPO dated Mar. 7, 2023 in connection with International Patent Application No. PCT/JP2021/032655.

* cited by examiner

LIQUID CRYSTAL DISPLAY DEVICE

CROSS-REFERENCE TO RELATED APPLICATIONS

This application is a Continuation of PCT International Application No. PCT/JP2021/032655 filed on Sep. 6, 2021, which was published under PCT Article 21(2) in Japanese, and which claims priority under 35 U.S.C. § 119(a) to Japanese Patent Application No. 2020-152570 filed on Sep. 11, 2020. The above applications are hereby expressly incorporated by reference, in their entirety, into the present application.

BACKGROUND OF THE INVENTION

1. Field of the Invention

The present invention relates to a liquid crystal display device.

2. Description of the Related Art

The liquid crystal display device is an electronic element that converts electrical information into visual information and displays the converted visual information by utilizing the fact that the transmittance of a liquid crystal changes in accordance with a change in an applied voltage.

A backlight unit is used in the liquid crystal display device. For example, a direct type backlight disposed directly below a liquid crystal display panel is used in JP2007-123250A.

SUMMARY OF THE INVENTION

As a result of studying the characteristics of the liquid crystal display device with a direct type backlight as described in JP2007-123250A, the present inventors have found that, in a portion where a difference in brightness is large, there is an occurrence of a halo in which an outline of a bright portion blurs due to the light going around a portion where black is originally displayed.

In addition, the liquid crystal display device is also required to have excellent display quality.

The present invention has been made in view of the above circumstances, and an object of the present invention is to provide a liquid crystal display device having excellent display quality and suppressed occurrence of halo.

As a result of extensive studies on the problems of the related art, the present inventors have found that the foregoing object can be achieved by the following configurations.

(1) A liquid crystal display device comprising, in the following order,
a first polarizer,
a liquid crystal cell,
a second polarizer, and
a direct type backlight that uses a point light source,
in which a light control member is further provided between the second polarizer and the direct type backlight, and
the liquid crystal display device satisfies relationships of Expression (1) to Expression (3) which will be described later.

(2) The liquid crystal display device according to (1), in which the light control member has a first optically anisotropic layer that satisfies relationships of Expression (4) to Expression (6) which will be described later.

(3) The liquid crystal display device according to (1) or (2), in which the light control member has a light absorption anisotropic layer containing a dichroic substance, and
in a case where a direction having a highest transmittance with respect to a surface of the light absorption anisotropic layer is defined as a transmission axis, an angle formed by a normal direction of the light absorption anisotropic layer and the transmission axis is 0° to 45°.

(4) The liquid crystal display device according to any one of (1) to (3), in which the light control member has a louver layer in which light transmission bands and light shielding bands are alternately and repeatedly disposed.

(5) The liquid crystal display device according to any one of (1) to (4), in which a second optically anisotropic layer including a positive A plate satisfying relationships of Expression (7) and Expression (8) which will be described later and a positive C plate satisfying relationships of Expression (9) and Expression (10) which will be described later is provided in at least between the first polarizer and the liquid crystal cell or at least between the second polarizer and the liquid crystal cell.

(6) The liquid crystal display device according to any one of (1) to (5), in which a third optically anisotropic layer satisfying relationships of Expression (11) and Expression (12) which will be described later is provided in at least between the first polarizer and the liquid crystal cell or at least between the second polarizer and the liquid crystal cell.

According to an aspect of the present invention, it is possible to provide a liquid crystal display device having excellent display quality and suppressed occurrence of halo.

DESCRIPTION OF THE PREFERRED EMBODIMENTS

Figure 1:
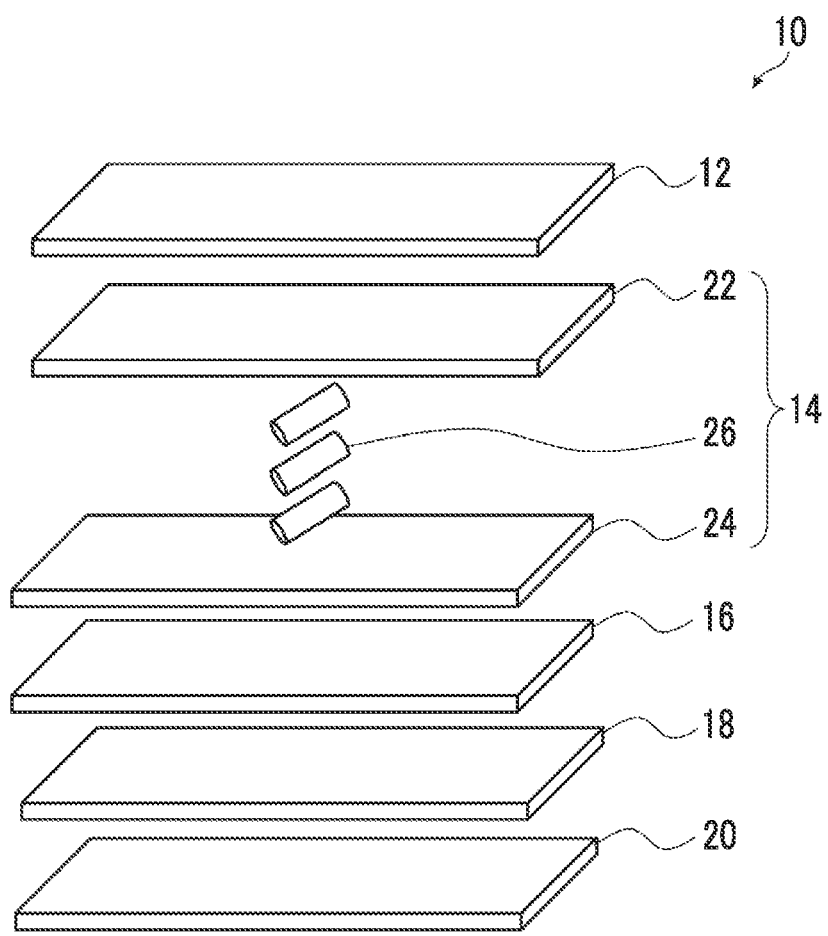
FIG. 1 is a schematic diagram showing an example of a liquid crystal display device of the present invention.

Hereinafter, the present invention will be described in more detail. Any numerical range expressed using "to" in the present specification refers to a range including the numerical values before and after the "to" as a lower limit value and an upper limit value, respectively. First, the terms used in the present specification will be described.

A slow axis is defined at a wavelength of 550 nm unless otherwise specified.

In the present invention, $Re(\lambda)$ and $Rth(\lambda)$ represent an in-plane retardation at a wavelength $\lambda$ and a thickness direction retardation at a wavelength λ, respectively. Unless otherwise specified, the wavelength λ is 550 nm.

In the present invention, Re(λ) and Rth(λ) are values measured at a wavelength of λ in AxoScan (manufactured by Axometrics, Inc.). By inputting an average refractive index ((nx+ny+nz)/3) and a film thickness (d(μm)) in AxoScan,
slow axis direction (°)

$$Re(\lambda)=R0(\lambda)$$

$$Rth(\lambda)=((nx+ny)/2-nz) \times d$$

are calculated.

Although R0(λ) is displayed as a numerical value calculated by AxoScan, R0(λ) means Re(λ).

In the present specification, refractive indexes nx, ny, and nz are measured using an Abbe refractometer (NAR-4T, manufactured by Atago Co., Ltd.) and using a sodium lamp (λ=589 nm) as a light source. In addition, in a case where the wavelength dependence is measured, the wavelength dependence can be measured with a multi-wavelength Abbe refractometer DR-M2 (manufactured by Atago Co., Ltd.) in combination with a dichroic filter.

In addition, the values in Polymer Handbook (John Wiley & Sons, Inc.) and catalogs of various optical films can be used. Examples of average refractive index values for major optical films are given below: cellulose acylate (1.48), cycloolefin polymer (1.52), polycarbonate (1.59), polymethyl methacrylate (1.49), and polystyrene (1.59).

In addition, in the present specification, the Nz factor is a value given by Nz=(nx−nz)/(nx−ny).

The term "visible light" in the present specification refers to light in a wavelength range of 400 to 700 nm.

In addition, a measurement wavelength in the present specification is 550 nm unless otherwise specified.

In the present specification, the positive A plate is defined as follows. The positive A plate satisfies a relationship of Expression (X) given below in a case where a refractive index in an in-plane slow axis direction of a film (in a direction in which an in-plane refractive index is maximum) is defined as nx, a refractive index in an in-plane direction orthogonal to the in-plane slow axis is defined as ny, and a refractive index in a thickness direction is defined as nz. The positive A plate has an Rth showing a positive value.

$$nx>ny\approx nz \qquad \text{Expression}(X):$$

It should be noted that the symbol "≈" encompasses not only a case where the both sides are completely the same as each other but also a case where the both sides are substantially the same as each other. The expression "substantially the same" means that, for example, a case where (ny−nz)×d (in which d is a thickness of a film) is −10 to 10 nm and preferably −5 to 5 nm is also included in "ny≈nz".

In addition, in the present specification, the positive C plate is defined as follows. The positive C plate satisfies a relationship of Expression (Y) given below in a case where a refractive index in an in-plane slow axis direction of a film (in a direction in which an in-plane refractive index is maximum) is defined as nx, a refractive index in an in-plane direction orthogonal to the in-plane slow axis is defined as ny, and a refractive index in a thickness direction is defined as nz. The positive C plate has an Rth showing a negative value.

$$nx\approx ny<nz \qquad \text{Expression}(Y):$$

It should be noted that the symbol "≈" encompasses not only a case where the both sides are completely the same as each other but also a case where the both sides are substantially the same as each other. The expression "substantially the same" means that, for example, a case where (nx−ny)×d (in which d is a thickness of a film) is −10 to 10 nm and preferably −5 to 5 nm is also included in "nx≈ny".

A feature point of the liquid crystal display device according to the embodiment of the present invention is that a light control member is disposed at a predetermined position to adjust ratios of brightness represented by I20/I0, I40/I0, and I60/I0 which will be described later. In other words, a desired effect is obtained in the present invention by controlling the profile of transmitted light through the liquid crystal display device.

Hereinafter, an example of the liquid crystal display device according to the embodiment of the present invention will be described with reference to the accompanying drawings.

A liquid crystal display device 10 shown in FIG. 1 has a first polarizer 12, a liquid crystal cell 14 (an upper substrate 22 of the liquid crystal cell, a liquid crystal layer 26, and a lower substrate 24 of the liquid crystal cell), a second polarizer 16, a light control member 18, and a direct type backlight 20 that uses a point light source, in this order. The liquid crystal cell 14 includes the upper substrate 22, the lower substrate 24, and the liquid crystal layer 26 sandwiched between the upper substrate 22 and the lower substrate 24.

In the following, first, the relationships of Expression (1) to Expression (3) which are feature points of the liquid crystal display device will be described, and then, the members constituting the liquid crystal display device 10 will be described in detail.

In the liquid crystal display device according to the embodiment of the present invention, the transmitted light in a white display state satisfies the relationships of Expression (1) to Expression (3).

$$70\% \leq (I20/I0) \times 100 \leq 90\% \qquad \text{Expression (1)}$$

$$10\% \leq (I40/I0) \times 100 \leq 35\% \qquad \text{Expression (2)}$$

$$1\% \leq (I60/I0) \times 100 \leq 20\% \qquad \text{Expression (3)}$$

I0 represents a brightness measured at a polar angle of 0° and an azimuthal angle of 0° in a state of the liquid crystal display device being brought into white display, I20 represents an average brightness obtained by arithmetically averaging a brightness measured at a polar angle of 20° and an azimuthal angle of 45°, a brightness measured at a polar angle of 20° and an azimuthal angle of 135°, a brightness measured at a polar angle of 20° and an azimuthal angle of 225°, and a brightness measured at a polar angle of 20° and an azimuthal angle of 315°, in a state of the liquid crystal display device being brought into white display, I40 represents an average brightness obtained by arithmetically averaging a brightness measured at a polar angle of 40° and an azimuthal angle of 45°, a brightness measured at a polar angle of 40° and an azimuthal angle of 135°, a brightness measured at a polar angle of 40° and an azimuthal angle of 225°, and a brightness measured at a polar angle of 40° and an azimuthal angle of 315°, in a state of the liquid crystal display device being brought into white display, and I60 represents an average brightness obtained by arithmetically averaging a brightness measured at a polar angle of 60° and an azimuthal angle of 45°, a brightness measured at a polar angle of 60° and an azimuthal angle of 135°, a brightness measured at a polar angle of 60° and an azimuthal angle of 225°, and a brightness measured at a polar angle of 60° and an azimuthal angle of 315°, in a state of the liquid crystal display device being brought into white display.

"(I20/I0)×100" in Expression (1) represents a ratio of I20 to I0, "(I40/I0)×100" in Expression (2) represents a ratio of I40 to I0, and "(I60/I0)×100" in Expression (3) represents a ratio of I60 to I0.

I20, I40, and I60 represent average brightness values in a case where the liquid crystal display device is brought into white display and observed from a predetermined oblique direction, and a desired effect is obtained in a case where these average brightness values are in a predetermined range with respect to I0 which is the brightness in a front direction.

Figure 2:
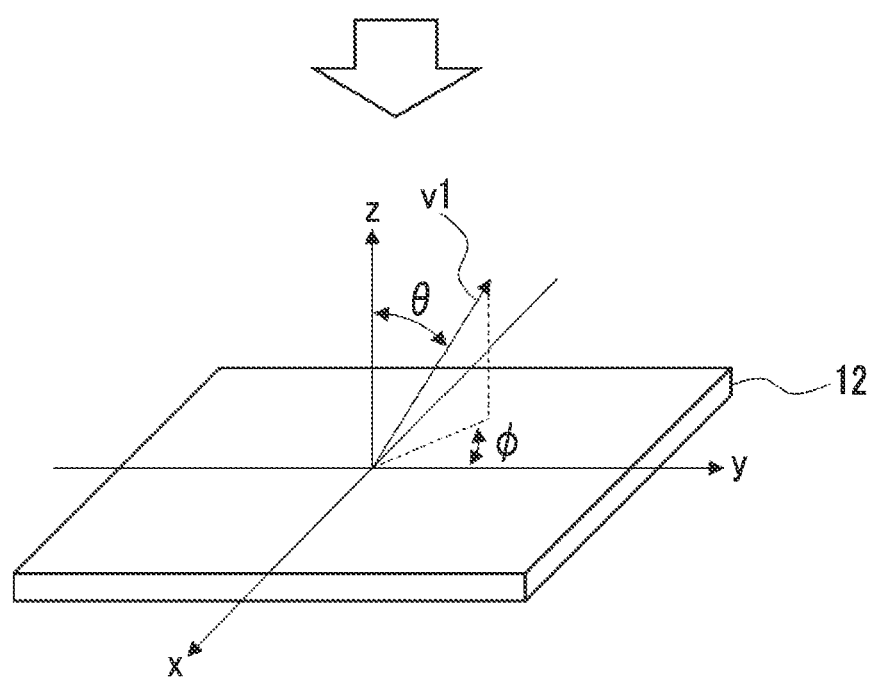
FIG. 2 is a view for explaining the definition of a polar angle and an azimuthal angle.

In the following, first, the polar angle and the azimuthal angle will be described with reference to FIG. 2. FIG. 2 corresponds to a view in which only the first polarizer 12 of the liquid crystal display device 10 in FIG. 1 is taken out.

In FIG. 2, a plane of the first polarizer 12 (main surface; a plane orthogonal to a thickness direction) is defined as an xy plane, and a y-axis direction is defined as an absorption axis of the first polarizer 12. Therefore, in FIG. 2, the y-axis direction serves as a reference for an azimuthal angle of 0°. As shown in FIG. 2, an angle θ formed by a vector v1 and a z-axis is defined as a polar angle (an angle formed with the normal direction of the first polarizer 12), and an angle φ formed by the projection of the vector v1 onto the xy plane and the y-axis (the absorption axis of the first polarizer 12) is defined as an azimuthal angle. That is, the polar angle means an angle formed with the normal direction of the first polarizer. In addition, the azimuthal angle represents an angle formed with the absorption axis of the first polarizer.

For example, a polar angle of 20° means an angle in which θ in FIG. 2 is 20°. In addition, an azimuthal angle of 45° means an angle in which φ in FIG. 2 is 45°.

In the present invention, in a case of expressing the azimuthal angle, the counterclockwise rotation with reference to the absorption axis direction of the first polarizer is represented by a positive value in a case where the first polarizer in the liquid crystal display device is viewed from the viewing side. Therefore, in FIG. 2, an azimuthal angle of 45° means an azimuth rotated by 45° counterclockwise from the reference y-axis.

From the viewpoint of obtaining at least one of further suppressing an effect of halo or achieving more excellent display quality (hereinafter, also simply referred to as "the viewpoint that the effect of the present invention is more excellent"), the liquid crystal display device according to the embodiment of the present invention preferably satisfies a relationship of Expression (1A) and more preferably satisfies a relationship of Expression (1B).

$$73\% \leq (I20/I0) \times 100 \leq 87\% \quad \text{Expression (1A)}$$

$$76\% \leq (I20/I0) \times 100 \leq 84\% \quad \text{Expression (1B)}$$

In addition, the liquid crystal display device according to the embodiment of the present invention preferably satisfies a relationship of Expression (2A) and more preferably satisfies a relationship of Expression (2B).

$$13\% \leq (I40/I0) \times 100 \leq 30\% \quad \text{Expression (2A)}$$

$$16\% \leq (I40/I0) \times 100 \leq 19\% \quad \text{Expression (2B)}$$

In addition, the liquid crystal display device according to the embodiment of the present invention preferably satisfies a relationship of Expression (3A) and more preferably satisfies a relationship of Expression (3B).

$$1\% \leq (I60/I0) \times 100 \leq 15\% \quad \text{Expression (3A)}$$

$$2\% \leq (I60/I0) \times 100 \leq 5\% \quad \text{Expression (3B)}$$

I0, I20, I40, and I60 are obtained by bringing the liquid crystal display device into a white display state in a dark room and measuring white brightness at predetermined polar angle positions and azimuthal angle positions using a measuring instrument (EZ-Contrast XL88, manufactured by ELDIM S.A.).

More specifically, I0 is obtained by bringing the liquid crystal display device into a white display state in a dark room, placing the measuring instrument at a position where the polar angle is 0° (θ in FIG. 2 is 0°) and the azimuthal angle is 0° (φ in FIG. 2 is 0°), and then measuring the brightness.

In addition, I20 is obtained as follows. First, the liquid crystal display device is brought into a white display state in a dark room, the measuring instrument is placed at a position where the polar angle is 20° (θ in FIG. 2 is 20°) and the azimuthal angle is 45° (φ in FIG. 2 is 45°), and then the brightness (brightness 20A) is obtained; the measuring instrument is placed at a position where the polar angle is 20° (θ in FIG. 2 is 20°) and the azimuthal angle is 135° (φ in FIG. 2 is 135°), and the brightness (brightness 20B) is obtained; the measuring instrument is placed at a position where the polar angle is 20° (θ in FIG. 2 is 20°) and the azimuthal angle is 225° (φ in FIG. 2 is 225°), and the brightness (brightness 20C) is obtained; and the measuring instrument is placed at a position where the polar angle is 20° (θ in FIG. 2 is 20°) and the azimuthal angle is 315° (φ in FIG. 2 is 315°), and the brightness (brightness 20D) is obtained. Next, the four obtained brightnesses (brightness 20A, brightness 20B, brightness 20C, and brightness 20D) are arithmetically averaged to obtain an average brightness, which is designated as I20.

In addition, I40 is obtained as follows. First, the liquid crystal display device is brought into a white display state in a dark room, the measuring instrument is placed at a position where the polar angle is 40° (θ in FIG. 2 is 40°) and the azimuthal angle is 45° (φ in FIG. 2 is 45°), and then the brightness (brightness 40A) is obtained; the measuring instrument is placed at a position where the polar angle is 40° (θ in FIG. 2 is 40°) and the azimuthal angle is 135° (φ in FIG. 2 is 135°), and the brightness (brightness 40B) is obtained; the measuring instrument is placed at a position where the polar angle is 40° (θ in FIG. 2 is 40°) and the azimuthal angle is 225° (φ in FIG. 2 is 225°), and the brightness (brightness 40C) is obtained; and the measuring instrument is placed at a position where the polar angle is 40° (θ in FIG. 2 is 40°) and the azimuthal angle is 315° (φ in FIG. 2 is 315°), and the brightness (brightness 40D) is obtained. Next, the four obtained brightnesses (brightness 40A, brightness 40B, brightness 40C, and brightness 40D) are arithmetically averaged to obtain an average brightness, which is designated as I40.

In addition, I60 is obtained as follows. First, the liquid crystal display device is brought into a white display state in a dark room, the measuring instrument is placed at a position where the polar angle is 60° (θ in FIG. 2 is 60°) and the azimuthal angle is 45° (φ in FIG. 2 is 45°), and then the brightness (brightness 60A) is obtained; the measuring instrument is placed at a position where the polar angle is 60° (θ in FIG. 2 is 60°) and the azimuthal angle is 135° (φ in FIG. 2 is 135°), and the brightness (brightness 60B) is obtained; the measuring instrument is placed at a position where the polar angle is 60° (θ in FIG. 2 is 60°) and the azimuthal angle is 225° (φ in FIG. 2 is 225°), and the brightness (brightness 60C) is obtained; and the measuring instrument is placed at a position where the polar angle is 60° (θ in FIG. 2 is 60°) and the azimuthal angle is 315° (φ in FIG. 2 is 315°), and the brightness (brightness 60D) is obtained. Next, the four obtained brightnesses (brightness 60A, brightness 60B, brightness 60C, brightness 60D) are arithmetically averaged to obtain an average brightness, which is designated as I60.

<First Polarizer and Second Polarizer>

The types of the first polarizer and the second polarizer are not particularly limited, and examples thereof include known polarizers.

Linear polarizers, for example, are preferable as the first polarizer and the second polarizer. The linear polarizer is preferably a polarizer consisting of a binder and iodine or a dichroic substance, or a coating type polarizer.

The iodine and the dichroic substance in the linear polarizer exhibit polarization performance by being aligned in the binder. It is preferable that the iodine and the dichroic substance are aligned along the binder molecule, or the dichroic substance is aligned in one direction by self-organization like liquid crystal. Currently, a commercially available polarizer is generally prepared by immersing a stretched polymer in a solution of iodine or a dichroic substance in a bath to allow the iodine or the dichroic substance to penetrate into the binder.

The thicknesses of the first polarizer and the second polarizer are not particularly limited, and are preferably 30 μm or less, more preferably 15 μm or less, and still more preferably 10 μm or less, from the viewpoint of reducing the thickness of the liquid crystal display device. In particular, from the viewpoint of suppressing the occurrence of appearance defects such as cracks and breaks in the polarizer due to differences in dimensional changes among the members during use and durability testing of the liquid crystal display device, the thicknesses of the first polarizer and the second polarizer are preferably 10 μm or less, more preferably 7 μm or less, and still more preferably 3 μm or less.

The lower limit of the thicknesses of the first polarizer and the second polarizer is not particularly limited, and is preferably 2 μm or more from the viewpoint of mechanical strength.

<Liquid Crystal Cell>

Liquid crystal cells of various display modes, examples of which include a twisted nematic (TN) mode, an in-plane switching (IPS) mode, a fringe field switching (FFS) mode, a ferroelectric liquid crystal (FLC) mode, an anti-ferroelectric liquid crystal (AFLC) mode, an optically compensatory bend (OCB) mode, a super twisted nematic (STN) mode, a vertically aligned (VA) mode, and a hybrid aligned nematic (HAN) mode, can be used as the liquid crystal cell.

The configuration of the liquid crystal cell is not particularly limited, and is preferably an aspect having a liquid crystal layer, and an upper substrate and a lower substrate which are disposed to sandwich the liquid crystal layer. The types of the upper substrate and the lower substrate are not particularly limited, and examples thereof include a glass substrate and a resin substrate.

It is preferable that an electrode (preferably, a transparent electrode) is disposed on the surface of at least one of the upper substrate or the lower substrate.

The liquid crystal cell may include a color filter layer and a thin film transistor (TFT) layer. The positions of the color filter layer and the TFT layer are not particularly limited and the color filter layer and the TFT layer are generally disposed on the surface of either the upper substrate or the lower substrate. It is preferable that the color filter layer and the TFT layer are disposed between the upper substrate and the lower substrate.

It is preferable that the slow axis of the liquid crystal compound in the liquid crystal layer (the slow axis in a black display state) and the absorption axis of the second polarizer are arranged to be parallel to each other.

In addition, the liquid crystal cell preferably has pixels consisting of at least blue, green, and red subpixels.

<Direct Type Backlight>

The liquid crystal display device according to the embodiment of the present invention has a direct type backlight that uses a point light source. The direct type backlight is a backlight that has a point light source on the opposite side of the liquid crystal cell from the viewing side.

The configuration of the direct type backlight is not particularly limited, and examples thereof include a known direct type backlight.

Figure 3:
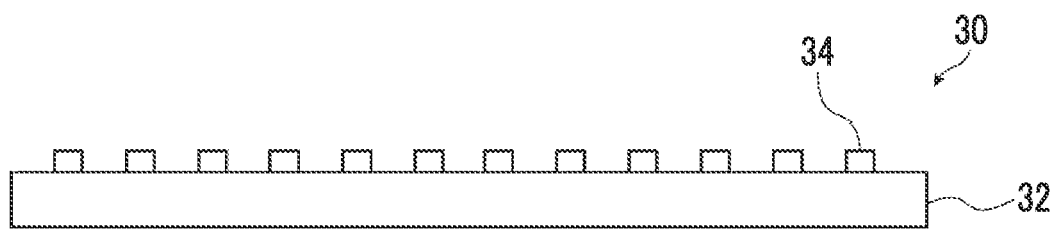
FIG. 3 is a cross-sectional view showing an example of a direct type backlight.
Figure 4:
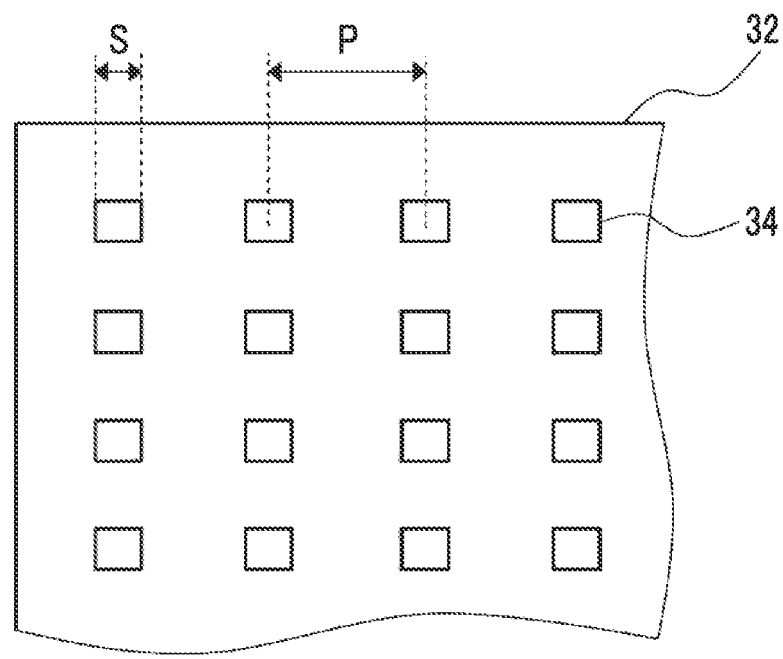
FIG. 4 is a plan view showing an example of a direct type backlight.

FIG. 3 and FIG. 4 show an example of the direct type backlight. FIG. 3 shows a cross-sectional view of the direct type backlight, and FIG. 4 shows a plan view of the direct type backlight.

As shown in FIG. 3 and FIG. 4, a direct type backlight 30 has a substrate 32 and a plurality of point light sources 34 arranged in a two-dimensional manner on the substrate 32. The plurality of point light sources 34 can be driven by a local dimming method, and the minimum unit of the local dimming drive may be one point light source or two or more point light sources.

The type of the point light source is not particularly limited, and examples thereof include a light emitting diode (LED) and a laser light source.

The point light source may be a white light source, and a plurality of light sources having different emission colors may be used.

A mini LED having a size S in FIG. 4 of 1.0 mm or less (preferably 0.6 mm or less and more preferably 0.15 mm or less) is preferable as the point light source.

The arrangement of the point light sources is suitably a lattice arrangement arranged in a two-dimensional lattice form, and may be a triangular arrangement, a hexagonal arrangement, or the like. The expression "lattice arrangement arranged in a two-dimensional lattice form" as used herein means an arrangement in which a light source row in which a plurality of point light sources are arranged at a constant pitch in one direction is arranged in a plurality of rows in a direction that intersects the one direction, so that the point light sources are positioned at lattice points of a two-dimensional lattice. In a case where the one direction and the intersecting direction are orthogonal to each other and the pitch of the point light source in the light source row and the arrangement pitch of the light source row are the same, the lattice is a square, and in a case where the one direction and the intersecting direction are orthogonal to each other and the pitch of the point light source in the light source row and the arrangement pitch of the light source row are different from each other, the lattice is a rectangle. In addition, in a case where the one direction and the intersecting direction are not orthogonal to each other, the lattice is a parallelogram. As described above, the point light sources are preferably arranged regularly, and may be arranged irregularly.

The distance P between the closest point light sources is preferably 2 to 20 mm. In a case where the point light sources are arranged regularly, the distance between the point light sources means an arrangement pitch.

The type of the substrate on which the point light sources are arranged is not particularly limited, and is preferably a reflective plate.

The reflective plate may be, for example, a reflective plate having a reflective surface consisting of a multilayer film formed of a white polyethylene terephthalate (PET) and a polyester-based resin.

<Light Control Member>

The light control member included in the liquid crystal display device according to the embodiment of the present invention is not particularly limited as long as the above-mentioned requirements of Expression (1) to Expression (3) are satisfied, and the following aspect 1 to aspect 3 are preferable.

Aspect 1: First optically anisotropic layer satisfying the relationships of Expression (4) to Expression (6) which will be described later Aspect 2: A light absorption anisotropic layer including a dichroic substance, in which, in a case where the direction in which the transmittance is highest with respect to the surface of the light absorption anisotropic layer is defined as a transmission axis, the angle formed by the normal direction of the light absorption anisotropic layer and the transmission axis is 0° to 45°

Aspect 3: A louver layer in which light transmission bands and light shielding bands are alternately and repeatedly disposed Hereinafter, the aspect 1 to the aspect 3 will be described in detail.

(Aspect 1)

The light control member may be, for example, a first optically anisotropic layer that satisfies the relationships of Expression (4) to Expression (6).

| 0 nm≤Re1(550)≤300 nm | Expression (4) |
| 100 nm≤|Rth1(550)|≤1000 nm | Expression (5) |
| |Nz|≥1.2 | Expression (6) |

Re1(550) represents an in-plane retardation of the first optically anisotropic layer at a wavelength of 550 nm. Rth1(550) represents a thickness direction retardation of the first optically anisotropic layer at a wavelength of 550 nm. Nz represents an Nz factor of the first optically anisotropic layer. In Expression (5), |Rth1(550)| represents an absolute value of Rth1(550). In Expression (6), |Nz| represents an absolute value of the Nz factor.

Above all, from the viewpoint that the effect of the present invention is more excellent, it is preferable that the first optically anisotropic layer satisfies relationships of Expression (4A) to Expression (6A).

| 100 nm≤Re1(550)≤300 nm | Expression (4A) |
| 200 nm≤|Rth1(550)|≤600 nm | Expression (5A) |
| 2.0≤|Nz|≤8.0 | Expression (6A) |

The configuration of the first optically anisotropic layer is not particularly limited as long as the first optically anisotropic layer satisfies the above optical properties, and examples thereof include a polymer film (in particular, a polymer film that has been subjected to a stretching treatment) and a film formed of a liquid crystal compound.

(Aspect 2)

The light control member may be, for example, a light absorption anisotropic layer including a dichroic substance, in which, in a case where the direction in which the transmittance is highest with respect to the surface of the light absorption anisotropic layer is defined as a transmission axis, the angle formed by the normal direction of the light absorption anisotropic layer and the transmission axis is 0° to 45°.

The angle formed by the normal direction of the light absorption anisotropic layer and the transmission axis is more preferably 0° to 20° and still more preferably 0° to 10° from the viewpoint that the effect of the present invention is more excellent.

As the method for measuring the transmission axis, a Mueller matrix of the light absorption anisotropic layer is measured at a wavelength of 550 nm in AxoScan OPMF-1 (manufactured by Opto Science, Inc.). In a case of measuring the transmission axis, the transmittance at all azimuthal angles at each polar angle is measured while changing the polar angle, which is an angle with respect to the normal direction of the light absorption anisotropic layer, from 0° to 90° in 5° increments, and the direction in which the transmittance is maximized is defined as the transmission axis.

In order for the light absorption anisotropic layer to achieve the direction of the transmission axis as described above, it is preferable to adjust the angle formed by the major axis of the dichroic substance and the thickness direction of the light absorption anisotropic layer to be 0° to 45° (preferably 0° to 20°).

Above all, it is preferable to vertically align the dichroic substance in the light absorption anisotropic layer. In other words, it is preferable to align the dichroic substance such that the major axis direction of the dichroic substance is substantially parallel to the thickness direction of the light absorption anisotropic layer. The phrase "substantially parallel to" means that the angle formed by the major axis direction of the dichroic substance and the thickness direction of the light absorption anisotropic layer is 0° to 45°.

The alignment degree of the light absorption anisotropic layer at a wavelength of 550 nm is not particularly limited, and is preferably 0.80 or more, more preferably 0.90 or more, and still more preferably 0.95 or more from the viewpoint that the effect of the present invention is more excellent. The upper limit of the alignment degree of the light absorption anisotropic layer may be, for example, 1.00.

The alignment degree is calculated by the following method.

First, the Mueller matrix of the light absorption anisotropic layer at a wavelength of 550 nm is measured every 5° from −70° to 70° polar angle, in AXoScan OPMF-1 (manufactured by Opto Science, Inc.). Next, after removing the influence of surface reflection, ko[λ] and ke[λ] are calculated by fitting to the following theoretical expression in consideration of Snell's equation and Fresnel's equation.

$$k=-\log(T)\times\lambda/(4\pi d)$$

From these obtained ko[λ] and ke[λ], the absorbance and the dichroic ratio in an in-plane direction and a thickness direction are calculated, and finally the alignment degree is obtained.

The transmittance of the light absorption anisotropic layer at a wavelength of 550 nm in a front direction is preferably 70% or more and more preferably 80% or more. The upper limit of the transmittance of the light absorption anisotropic layer is not particularly limited, and is often 90% or less.

The transmittance of the light absorption anisotropic layer at a wavelength of 550 nm in a direction inclined by 30° from the transmission axis is preferably 60% or less, more preferably 40% or less, and still more preferably 30% or less.

The transmittance of the above-mentioned light absorption anisotropic layer can be appropriately adjusted depending on the concentration of the dichroic substance, the thickness of the light absorption anisotropic layer, and the like.

The light absorption anisotropic layer is preferably formed of a composition containing a dichroic substance and a liquid crystal compound.

The dichroic substance refers to a substance having properties in which the absorbance in the major axis direction of the molecule and the absorbance in the minor axis direction of the molecule are different from each other.

In addition, examples of the dichroic substance include a rod-like dichroic substance and a disk-like dichroic substance depending on the molecular shape thereof, among which a rod-like dichroic substance is preferable.

The maximum absorption wavelength of the dichroic substance is preferably 40° to 500 nm and more preferably 440 to 480 nm.

As the method for measuring the maximum absorption wavelength of the dichroic substance, a chloroform solution containing a dichroic substance (concentration: 10 mg/L) and a reference not containing a dichroic substance are prepared, and a spectrophotometer (UV-3150, manufactured by Shimadzu Corporation) (method: double beam method, wavelength range: 380 to 680 nm in 2 nm steps) is used to measure the absorption spectrum of the dichroic substance to obtain the maximum absorption wavelength of the dichroic substance.

Examples of the dichroic substance include an acridine coloring agent, an oxazine coloring agent, a cyanine coloring agent, a naphthalene coloring agent, an azo coloring agent, and an anthraquinone coloring agent, among which an azo coloring agent is preferable. Examples of the azo coloring agent include a monoazo coloring agent, a bisazo coloring agent, a trisazo coloring agent, a tetrakisazo coloring agent, and a stilbene azo coloring agent, among which a bisazo coloring agent or a trisazo coloring agent is preferable. In addition, the compounds described in JP2018-053167A are also preferable.

The dichroic substance may have a polymerizable group. In a case where the dichroic substance has a polymerizable group, this makes it possible to form a light absorption anisotropic layer which exhibits no decrease in the degree of cross-linking of the light absorption anisotropic layer even in a case where a large amount of the dichroic substance is used, and which has excellent durability while exhibiting high selective wavelength absorptivity even in a case where the layer is thin.

Examples of the polymerizable group include a polymerizable group having an ethylenically unsaturated bond such as a vinyl group, a vinyloxy group, a styryl group, a p-(2-phenylethenyl)phenyl group, an acryloyl group, a methacryloyl group, an acryloyloxy group, or a methacryloyloxy group, an epoxy group, and an oxetanyl group.

The dichroic substance preferably has an aromatic ring. Examples of the aromatic ring include an aromatic hydrocarbon ring and an aromatic heterocyclic ring, among which an aromatic hydrocarbon ring is preferable and a benzene ring is more preferable.

The liquid crystal compound preferably has a polymerizable group. That is, the composition preferably contains a polymerizable liquid crystal compound (a liquid crystal compound having a polymerizable group). The definition of the polymerizable group is as described in the section of the dichroic substance.

The liquid crystal compound preferably has an aromatic ring. Examples of the aromatic ring include an aromatic hydrocarbon ring and an aromatic heterocyclic ring, among which an aromatic hydrocarbon ring is preferable and a benzene ring is more preferable.

Examples of the polymerizable liquid crystal compound include a low-molecular-weight liquid crystalline compound having a polymerizable group and a high-molecular-weight liquid crystalline compound having a polymerizable group.

Here, the "low-molecular-weight liquid crystalline compound" means a liquid crystal compound having no repeating unit in a chemical structure thereof. In addition, the "high-molecular-weight liquid crystalline compound" means a liquid crystal compound having a repeating unit in a chemical structure thereof.

Examples of the low-molecular-weight liquid crystalline compound include compounds described in JP2013-228706A.

Examples of the high-molecular-weight liquid crystalline compound include thermotropic liquid crystal polymers described in JP2011-237513A and side chain type liquid crystal compounds described in JP2015-107492A.

The low-molecular-weight liquid crystalline compound can be broadly classified into a rod-like liquid crystal compound and a disk-like liquid crystal compound according to the molecular shape. In a case where the dichroic substance has a rod-like shape, a rod-like liquid crystal compound is preferable as the low-molecular-weight liquid crystalline compound from the viewpoint of increasing the degree of alignment order.

The high-molecular-weight liquid crystalline compound can be broadly classified into a main chain type liquid crystal compound and a side chain type liquid crystal compound. The main chain type liquid crystal compound is a compound having a structure exhibiting liquid crystallinity in a polymer main chain, and the side chain type liquid crystal compound is a compound having a structure exhibiting liquid crystallinity in a polymer side chain portion. The side chain type liquid crystal compound is preferable from the viewpoint of a high degree of alignment order of the resulting light absorption anisotropic layer and excellent solubility in a solvent in a case where the composition is prepared.

The composition may contain components other than the dichroic substance and the liquid crystal compound.

The composition preferably contains a vertical alignment agent. In a case where the composition contains a vertical alignment agent, the alignment of the dichroic substance and the liquid crystal compound can be made more vertical, and the degree of alignment order can be made higher.

Examples of the vertical alignment agent include a boronic acid compound and an onium salt.

Examples of other components include a leveling agent, a polymerization initiator, and a solvent.

The method for forming the light absorption anisotropic layer formed of the above-mentioned composition is not particularly limited, and may be, for example, a method of including a step of applying the above-mentioned composition onto a predetermined substrate to form a coating film (hereinafter, also referred to as a "coating film forming step"), a step of aligning the liquid crystal component contained in the coating film (hereinafter, also referred to as an "alignment step"), and a step of subjecting the coating film to a curing treatment (hereinafter, also referred to as a "curing step") in this order.

Hereinafter, each of the above steps will be described in detail.

The coating film forming step is a step of applying a composition onto a predetermined substrate to form a coating film.

The type of the substrate is not particularly limited, and examples thereof include a transparent support, and a laminate having an alignment film disposed on a transparent support.

The method for applying the composition is not particularly limited, and may be, for example, a known method.

The alignment step is a step of aligning the liquid crystal component contained in the coating film.

The alignment step may include a drying treatment. The drying treatment makes it possible to remove components such as a solvent from the coating film.

The alignment step preferably includes a heat treatment. Thereby, the liquid crystal component contained in the coating film can be aligned.

The alignment step may include a cooling treatment carried out after the heat treatment.

The curing step is carried out, for example, by heating and/or light irradiation (exposure to light). Above all, it is preferable that the curing step is carried out by light irradiation.

(Aspect 3)

The light control member may be, for example, a louver layer in which light transmission bands and light shielding bands are alternately and repeatedly disposed.

Hereinafter, aspects of the louver layer will be described with reference to the accompanying drawings.

Figure 5:
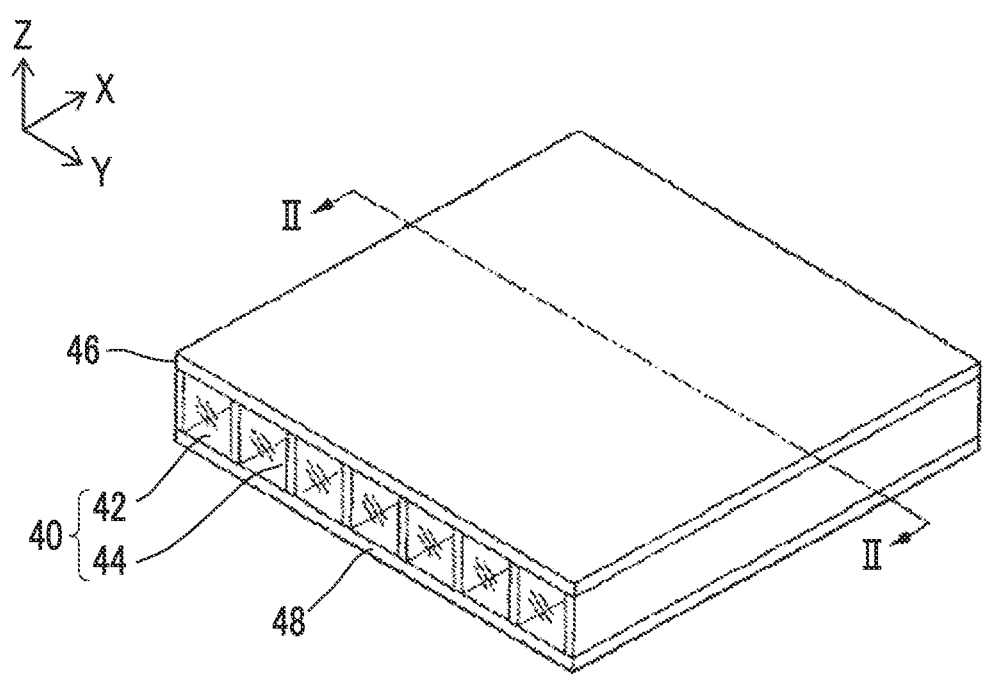
FIG. 5 is a schematic diagram showing an example of a louver layer.

As shown in FIG. 5, light transmission bands 42 and light shielding bands 44 are alternately disposed in a louver layer 40. A first transparent protective layer 46 is laminated on one surface of the louver layer 40, and a second transparent protective layer 48 is laminated on the other surface of the louver layer 40.

Figure 6:
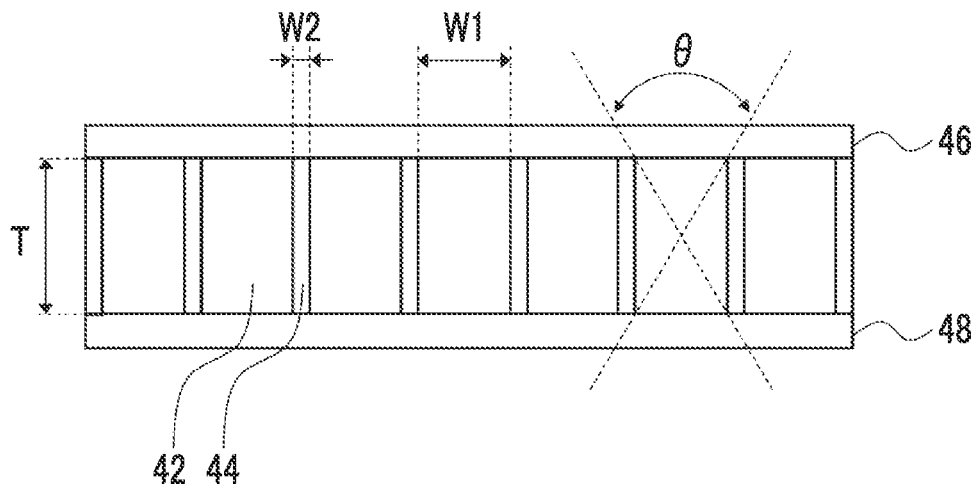
FIG. 6 is a cross-sectional view taken along a line II-II in FIG. 5.

FIG. 6 is a cross-sectional view taken along a line II-II in FIG. 5.

It is sufficient that the liquid crystal display device includes the louver layer, and the first transparent protective layer 46 and the second transparent protective layer 48 may or may not be included.

Assuming that the thickness direction of the louver layer 40 is defined as a Z direction and the two directions perpendicular to each other in the plane perpendicular to the Z direction are defined as an X direction and a Y direction, respectively, the light transmission band 42 and the light shielding band 44 constituting the louver layer 40 are both band-like extending in the X direction, and a plurality of light transmission bands 42 and a plurality of light shielding bands 44 are alternately disposed in the Y direction. The widths of the plurality of light transmission bands 42 are uniform in the Y direction and are constant in the X direction. In addition, the widths of the plurality of light shielding bands 44 are also uniform in the Y direction and are constant in the X direction.

A resin having high transparency and low birefringence of transmitted light is used as the material of the light transmission band 42. From the viewpoint of transparency, it is preferable to use a resin material having high transparency whose light transmittance in a case where light is transmitted in the Z direction in the drawing is 75% or more and preferably 85% or more with respect to only the light transmission band 42.

Specific examples of the resin having high transparency and low birefringence include a silicone resin, a polycarbonate resin, a polyolefin-based resin (in particular, a cycloolefin polymer), a cellulose-based resin, and an acrylic resin. Above all, a silicone resin is preferable, and from the viewpoint that heat resistance is particularly favorable, a silicone rubber is more preferable.

The value of the "light transmittance" is a value obtained by light transmittance=(B/A)×100 (unit: %), assuming that, in a device that uses D65 defined in JIS Z 8720 as a light source and measures the intensity of the test light emitted from the light source with a light receiving sensor, the output value of the light receiving sensor in a state where there is no object to be measured on the optical path of the test light is defined as A, and the output value of the light receiving sensor in a state where the object to be measured is set on the optical path of the test light and the light transmitted through the object to be measured is received by the light receiving sensor is defined as B.

A colored resin obtained by using the resin mentioned above as the material of the light transmission band 42 as a substrate and adding coloring agents such as a pigment and a dye to the substrate is suitably used as the material of the light shielding band 44. The tone of the light shielding band 44 may be any tone as long as preferable light shielding properties of the light shielding band 44 can be obtained, and examples thereof include black, red, yellow, green, blue, and light blue. The tone of the light shielding band 44 can be adjusted depending on the type and amount of the coloring agent added. Specifically, it is preferable to have light shielding properties such that the light transmittance in a case where light is transmitted in the Y direction in the drawing is 40% or less (preferably 10% or less) with respect to only the light shielding band 44.

Examples of the coloring agent include general organic pigments or inorganic pigments such as carbon black, Bengala, iron oxide, titanium oxide, yellow iron oxide, disazo yellow, and phthalocyanine blue. One type of coloring agent may be used or two or more types of coloring agents may be used. In addition, in a case where a black pigment is not used, it is preferable to use a white pigment in combination in order to obtain favorable light shielding properties.

In the louver layer 40, the resin material forming the light transmission band 42 and the resin material as the substrate of the light shielding band 44 may be the same or different, and from the viewpoint of adhesiveness between the light transmission band 42 and the light shielding band 44, both resin materials are preferably the same.

In the louver layer 40, a viewing angle θ in a plane perpendicular to the X direction (paper plane in FIG. 6) is determined by the thickness in the Z direction and the width in the Y direction of the light transmission band 42. In addition, the ratio of the width of the light transmission band 42 to the width of the light shielding band 44 in the Y direction affects the transmittance of rays parallel to the Z direction.

Specifically, the viewing angle θ in the louver layer 40 is preferably 30° to 150° and more preferably 60° to 120°.

A thickness T of the light transmission band 42 in the Z direction is preferably 50 to 200 μm and more preferably 100 to 200 μm.

A width W1 of the light transmission band 42 in the Y direction is preferably 30 to 300 μm and more preferably 50 to 200 μm.

A width W2 of the light shielding band 44 in the Y direction is preferably 5 to 30 μm and more preferably 10 to 20 μm.

A suitable range of the thickness T of the light shielding band 44 in the Z direction is the same as a suitable range of the thickness T of the light transmission band 42 in the Z direction.

With regard to the material of the first transparent protective layer 46 and the second transparent protective layer 48, a resin having high transparency is used, and a resin having a small variation in in-plane birefringence index is preferable.

From the viewpoint of transparency, the light transmittance of each of the first transparent protective layer 46 and the second transparent protective layer 48 in a case where light is transmitted in the Z direction in the drawing is preferably 75% or more and more preferably 85% or more.

A specific example of the resin having high transparency and a small variation in in-plane birefringence index in a state of being formed into a film is preferably a polycarbonate resin, a polyolefin-based resin (in particular, a cycloolefin polymer), a cellulose-based resin, or an acrylic resin, and more preferably a polycarbonate resin.

The thickness of each of the first transparent protective layer 46 and the second transparent protective layer 48 is preferably 0.01 to 0.2 mm and more preferably 0.01 to 0.1 mm.

The first transparent protective layer 46 and the second transparent protective layer 48 may be made of the same material or may be made of different materials. In addition, the thickness of the first transparent protective layer 46 and the thickness of the second transparent protective layer 48 may be the same or different.

It is preferable that the first transparent protective layer 46 and the second transparent protective layer 48 are adhesively integrated with the louver layer 40 through an adhesive layer (not shown).

The method for producing the louver layer is not particularly limited, and examples thereof include the production method described in JP2007-086142A.

In the above description, the aspect in which the light transmission band and the light shielding band extend along a thickness direction has been described, but the present invention is not limited to this aspect, and it may be an aspect in which the light transmission band and the light shielding band are inclined with respect to a thickness direction.

In the above description, the aspect in which the light transmission band and the light shielding band each have a constant width in a thickness direction has been described, but the present invention is not limited to this aspect, and it may be an aspect in which the width of the light transmission band and the light shielding band narrows or widens as it goes in one direction.

As described above, the structures of the light transmission band and the light shielding band can be appropriately adjusted.

<Other Members>

The liquid crystal display device may have a member other than the above-mentioned members.

From the viewpoint that the effect of the present invention is more excellent, the liquid crystal display device preferably has a second optically anisotropic layer including a positive A plate satisfying the relationships of Expression (7) and Expression (8) and a positive C plate satisfying the relationships of Expression (9) and Expression (10) in at least between the first polarizer and the liquid crystal cell or at least between the second polarizer and the liquid crystal cell.

$$80 \text{ nm} \leq ReA(550) \leq 160 \text{ nm} \quad \text{Expression (7)}$$

$$0.75 < ReA(450)/ReA(550) < 1.00 \quad \text{Expression (8)}$$

$$-160 \text{ nm} \leq RthC(550) \leq -60 \text{ nm} \quad \text{Expression (9)}$$

$$0.75 < RthC(450)/RthC(550) < 1.00 \quad \text{Expression (10)}$$

ReA(550) represents an in-plane retardation of the positive A plate at a wavelength of 550 nm. ReA(450) represents an in-plane retardation of the positive A plate at a wavelength of 45° nm. RthC(550) represents a thickness direction retardation of the positive C plate at a wavelength of 550 nm. RthC(450) represents a thickness direction retardation of the positive C plate at a wavelength of 450 nm.

The positive A plate preferably satisfies relationships of Expression (7A) and Expression (8A) from the viewpoint that the effect of the present invention is more excellent.

$$110 \text{ nm} \leq ReA(550) \leq 140 \text{ nm} \quad \text{Expression (7A)}$$

$$0.80 < ReA(450)/ReA(550) < 0.95 \quad \text{Expression (8A)}$$

The positive C plate preferably satisfies relationships of Expression (9A) and Expression (10A) from the viewpoint that the effect of the present invention is more excellent.

$$-130 \text{ nm} \leq RthC(550) \leq -90 \text{ nm} \quad \text{Expression (9A)}$$

$$0.80 < RthC(450)/RthC(550) < 0.95 \quad \text{Expression (10A)}$$

The configuration of the second optically anisotropic layer is not particularly limited as long as the second optically anisotropic layer satisfies the above optical properties, and examples thereof include a polymer film (in particular, a polymer film that has been subjected to a stretching treatment) and a film formed of a liquid crystal compound.

The liquid crystal display device preferably has a third optically anisotropic layer satisfying the relationships of Expression (11) and Expression (12) in at least between the first polarizer and the liquid crystal cell or at least between the second polarizer and the liquid crystal cell.

$$200 \text{ nm} \leq Re3(550) \leq 400 \text{ nm} \quad \text{Expression (11)}$$

$$0 \text{ nm} \leq |Rth3(550)| \leq 50 \text{ nm} \quad \text{Expression (12)}$$

Re3(550) represents an in-plane retardation of the third optically anisotropic layer at a wavelength of 550 nm. Rth3(550) represents a thickness direction retardation of the third optically anisotropic layer at a wavelength of 550 nm. In Expression (12), |Rth3(550)| represents an absolute value of Rth3(550).

The third optically anisotropic layer preferably satisfies relationships of Expression (11A) and Expression (12A) from the viewpoint that the effect of the present invention is more excellent.

$$250 \text{ nm} \leq Re3(550) \leq 350 \text{ nm} \quad \text{Expression (11A)}$$

$$0 \text{ nm} \leq |Rth3(550)| \leq 20 \text{ nm} \quad \text{Expression (12A)}$$

The configuration of the third optically anisotropic layer is not particularly limited as long as the third optically anisotropic layer satisfies the above optical properties, and examples thereof include a polymer film (in particular, a polymer film that has been subjected to a stretching treatment) and a film formed of a liquid crystal compound.

(Light Diffusing Plate)

The liquid crystal display device may have a light diffusing plate. It is preferable that the light diffusing plate is disposed between the light control member and the direct type backlight.

The light diffusing plate is a plate that disturbs the traveling direction of incident light so that light with uniform brightness can be emitted from the main surface (plate surface).

A known light diffusing plate can be used as the light diffusing plate.

(Brightness Improving Film)

The liquid crystal display device may have a brightness improving film. It is preferable that the brightness improving film is disposed between the light control member and the direct type backlight. It is preferable that the brightness improving film is disposed on the viewing side (the side opposite to the direct type backlight) with respect to the light diffusing plate.

The brightness improving film may be, for example, a reflective polarizing film. The reflective polarizing film has a function of separating linearly polarized light, is disposed, for example, between the second polarizer and the direct type backlight, and has a function of back-reflecting or back-scattering the linearly polarized light toward the direct type backlight.

Examples of the multilayered brightness improving film using the principle of a dielectric mirror include DBEF-E, DBEF-D, DBEF-M, and DBEF-P2 (all manufactured by 3M Corporation).

EXAMPLES

Hereinafter, features of the present invention will be described in more detail with reference to Examples and Comparative Examples. The materials, amounts used, proportions, treatment details, treatment procedure, and the like shown in the following Examples can be appropriately changed without departing from the spirit and scope of the present invention. Accordingly, the scope of the present invention should not be construed as being limited by the specific examples given below.

Example 1

An optically anisotropic film 1 having an Re(550) of 100 nm, an Rth(550) of −300 nm, and an Nz factor of −2.5 was prepared by biaxially stretching ARTON (manufactured by JSR Corporation).

Then, a liquid crystal display device of Example 1 was prepared by bonding the optically anisotropic film 1 to the second polarizer disposed on the backlight side of ProArt PA32UCX (manufactured by ASUSTeK Computer Inc.), which has a first polarizer, a liquid crystal cell, a second polarizer, a brightness improving film, a light diffusing plate, and a direct type backlight in this order, through a pressure-sensitive adhesive to dispose the optically anisotropic film 1 between the second polarizer and the direct type backlight (also applicable between the second polarizer and the brightness improving film).

In the direct type backlight, a plurality of mini LEDs are mounted as point light sources.

Example 2

(Formation of Alignment Film)

A surface of a cellulose acylate film (TAC substrate having a thickness of 40 µm; TG40, manufactured by FUJIFILM Corporation) was saponified with an alkaline solution, and a composition for forming an alignment film was applied thereto with a wire bar. The support on which the coating film was formed was dried with hot air at 60° C. for 60 seconds and further with hot air at 100° C. for 120 seconds to form an alignment film, thereby obtaining a TAC film with an alignment film. The film thickness of the alignment film was 1 µm.

(Composition for Forming Alignment Film)

| Modified polyvinyl alcohol PVA-1 | 3.80 parts by mass |
| IRGACURE 2959 | 0.20 parts by mass |
| Water | 70 parts by mass |
| Methanol | 30 parts by mass |

Modified Polyvinyl Alcohol PVA-1

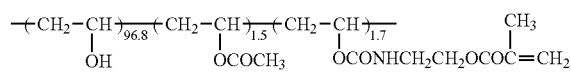

(Formation of Light Absorption Anisotropic Layer)

The following composition for forming a light absorption anisotropic layer was continuously applied onto the obtained alignment film with a wire bar, and the obtained coating film was heated at 120° C. for 60 seconds and then cooled to room temperature (23° C.).

Next, the support on which the coating film was formed was heated at 80° C. for 60 seconds and cooled again to room temperature.

Then, the obtained coating film was irradiated with an LED lamp (central wavelength: 365 nm) for 2 seconds under an irradiation condition of an illuminance of 200 mW/cm² to prepare a light absorption anisotropic layer on the alignment film.

The film thickness of the light absorption anisotropic layer was 3.0 µm. The light absorption anisotropic layer had a transmittance of 80% at a wavelength of 550 nm and an alignment degree of 0.97. In addition, the angle formed by the transmission axis of the above-mentioned optically anisotropic layer and the normal direction of the light absorption anisotropic layer was 0°.

Composition for Forming Light Absorption Anisotropic Layer

| Dichroic substance D-1 | 0.63 parts by mass |
| Dichroic substance D-2 | 0.17 parts by mass |
| Dichroic substance D-3 | 1.13 parts by mass |
| High-molecular-weight liquid crystalline compound P-1 | 8.18 parts by mass |
| IRGACURE OXE-02 (manufactured by BASF SE) | 0.16 parts by mass |
| Compound E-1 | 0.12 parts by mass |
| Compound E-2 | 0.12 parts by mass |
| Surfactant F-1 | 0.005 parts by mass |
| Cyclopentanone | 85.00 parts by mass |
| Benzyl alcohol | 4.50 parts by mass |

Dichronic substance D-1
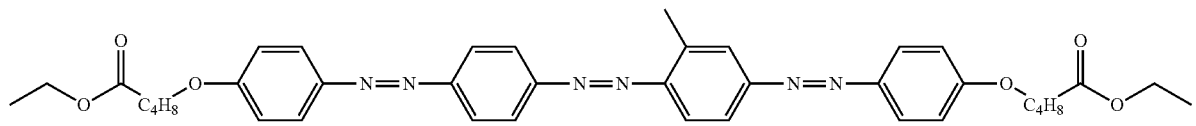
Dichronic substance D-2
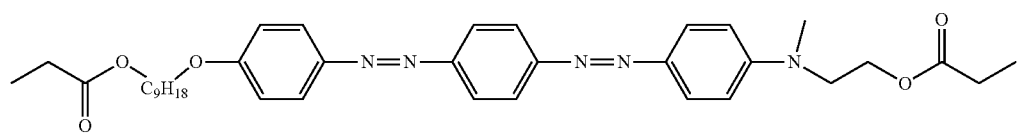
Dichronic substance D-3
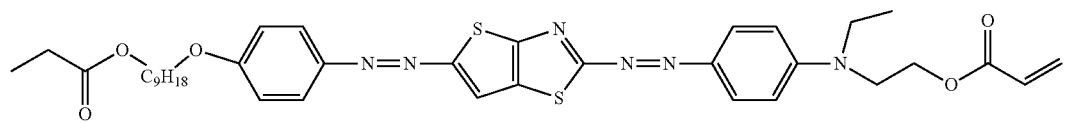
High-molecular-weight liquid crystalline compound P-1
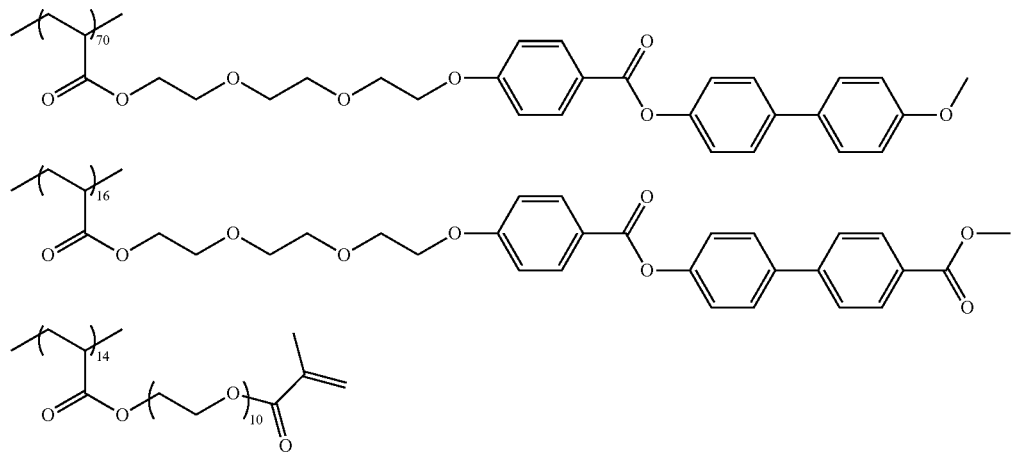
Compound E-1
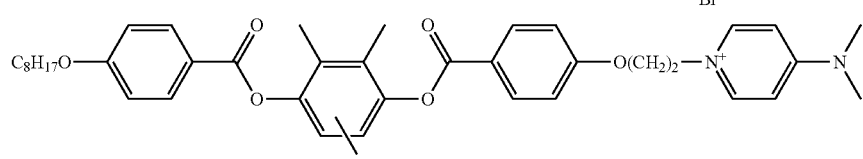
Compound E-2
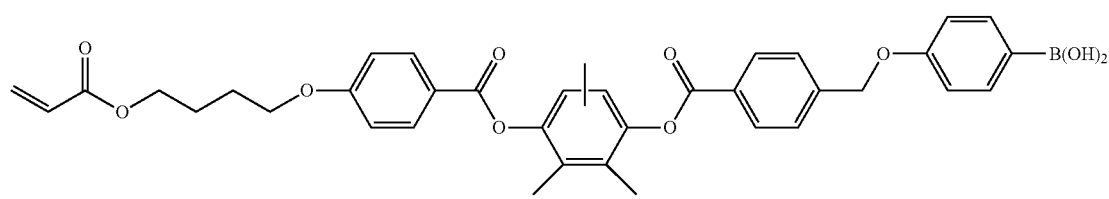
Surfactant F-1
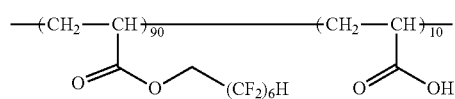

(Formation of Tint Adjusting Layer)

The following composition for forming a tint adjusting layer was continuously applied onto the obtained light absorption anisotropic layer with a wire bar to form a coating film.

Next, the support on which the coating film was formed was dried with hot air at 60° C. for 60 seconds and further with hot air at 100° C. for 120 seconds to form a tint adjusting layer, thereby obtaining an optical film.

The film thickness of the tint adjusting layer was 0.5 μm.

(Composition for Forming Tint Adjusting Layer)

| Modified polyvinyl alcohol PVA-1 | 3.80 parts by mass |
| IRGACURE 2959 | 0.20 parts by mass |
| Coloring agent compound G-1 | 0.08 parts by mass |
| Water | 70 parts by mass |
| Methanol | 30 parts by mass |

Coloring Agent Compound G-1

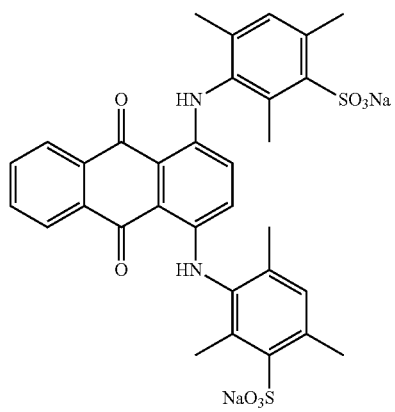

Then, a liquid crystal display device of Example 2 was prepared by bonding the optical film to the second polarizer disposed on the backlight side of ProArt PA32UCX (manufactured by ASUSTeK Computer Inc.), which has a first polarizer, a liquid crystal cell, a second polarizer, and a direct type backlight in this order, through a pressure-sensitive adhesive to dispose the optical film between the second polarizer and the direct type backlight (also applicable between the second polarizer and the brightness improving film).

Example 3

A liquid crystal display device of Example 3 was prepared by bonding the optically anisotropic film 1 prepared in Example 1 and the optical film including the light absorption anisotropic layer prepared in Example 2 to the second polarizer disposed on the backlight side of ProArt PA32UCX (manufactured by ASUSTeK Computer Inc.), which has a first polarizer, a liquid crystal cell, a second polarizer, and a direct type backlight in this order, through a pressure-sensitive adhesive to dispose the optically anisotropic film 1 and the optical film between the second polarizer and the direct type backlight (also applicable between the second polarizer and the brightness improving film).

Example 4

According to the method described in JP2007-086142A, the louver layer shown in FIG. 6 was prepared in which the width W2 of the light shielding band is 15 μm, the width W1 of the light transmission band is 70 μm, the thickness T of each of the light shielding band and the light transmission band is 150 μm, and the light transmission band and the light shielding band are alternately and repeatedly disposed.

A liquid crystal display device was prepared in the same manner as in Example 1, except that the louver layer was used instead of the optically anisotropic film. The louver layer was disposed such that the absorption axis of the second polarizer and the direction in which the light transmission band of the louver layer extends were orthogonal to each other.

Example 5

An optically anisotropic film 2 consisting of a positive A plate with Re(550) of 130 nm and Re(450)/Re(550) of 0.86 and a positive C plate with Rth(550) of −105 nm and Rth(450)/Rth(550) of 0.90 was prepared according to the method described in WO2018/207798A.

Then, the optically anisotropic film 2 was disposed between the first polarizer and the liquid crystal cell in the liquid crystal display device prepared in Example 3 to prepare a liquid crystal display device. The optically anisotropic film 2 was disposed such that the slow axis of the optically anisotropic film 2 and the absorption axis of the first polarizer were parallel to each other.

Example 6

An optically anisotropic film 3 with Re(550) of 280 nm and |Rth(550)| of 0 nm was prepared according to the method described in JP2006-72309A.

Then, the optically anisotropic film 3 was disposed between the second polarizer and the liquid crystal cell in the liquid crystal display device prepared in Example 3 to prepare a liquid crystal display device. The optically anisotropic film 3 was disposed such that the slow axis of the optically anisotropic film 3 and the absorption axis of the second polarizer were orthogonal to each other.

Example 7

The optically anisotropic film 2 was disposed between the first polarizer and the liquid crystal cell in the liquid crystal display device prepared in Example 4 to prepare a liquid crystal display device. The optically anisotropic film 2 was disposed such that the slow axis of the optically anisotropic film 2 and the absorption axis of the first polarizer were parallel to each other.

Example 8

The optically anisotropic film 3 was disposed between the second polarizer and the liquid crystal cell in the liquid crystal display device prepared in Example 4 to prepare a liquid crystal display device. The optically anisotropic film 3 was disposed such that the slow axis of the optically anisotropic film 3 and the absorption axis of the second polarizer were orthogonal to each other.

Comparative Examples 1 and 2

A liquid crystal display device satisfying I20/I0, I40/I0, and I60/I0 shown in Table 1 which will be described later was prepared by changing the types of the light diffusing plate and the brightness improving film in ProArt PA32UCX (manufactured by ASUSTeK Computer Inc.), which has a first polarizer, a liquid crystal cell, a second polarizer, a brightness improving film, a light diffusing plate, and a direct type backlight in this order.

Comparative Example 3

According to the method described in JP2007-086142A, the louver layer shown in FIG. 6 was prepared in which the width W2 of the light shielding band is 30 µm, the width W1 of the light transmission band is 20 µm, the thickness T of each of the light shielding band and the light transmission band is 300 µm, and the light transmission band and the light shielding band are alternately and repeatedly disposed.

A liquid crystal display device was prepared in the same manner as in Example 1, except that the louver layer was used instead of the optically anisotropic film. The louver layer was disposed such that the absorption axis of the second polarizer and the direction in which the light transmission band of the louver layer extends were orthogonal to each other.

<Measurement of I20/I0, I40/I0, and I60/I0>

I0, I20, I40, and I60 were obtained by bringing the liquid crystal display device into a white display state in a dark room and measuring white brightness at predetermined polar angle positions and azimuthal angle positions using a measuring instrument (EZ-Contrast XL88, manufactured by ELDIM S.A.).

More specifically, I0 was obtained by bringing the liquid crystal display device into a white display state in a dark room, placing the measuring instrument at a position where the polar angle is 0° (θ in FIG. 2 is 0°) and the azimuthal angle is 0° (φ in FIG. 2 is 0°), and then measuring the brightness.

In addition, I20 was obtained as follows. First, the liquid crystal display device was brought into a white display state in a dark room, the measuring instrument was placed at a position where the polar angle is 20° (θ in FIG. 2 is 20°) and the azimuthal angle is 45° (φ in FIG. 2 is 45°), and then the brightness (brightness 20A) was obtained; the measuring instrument was placed at a position where the polar angle is 20° (θ in FIG. 2 is 20°) and the azimuthal angle is 135° (φ in FIG. 2 is 135°), and the brightness (brightness 20B) was obtained; the measuring instrument was placed at a position where the polar angle is 20° (θ in FIG. 2 is 20°) and the azimuthal angle is 225° (φ in FIG. 2 is 225°), and the brightness (brightness 20C) was obtained; and the measuring instrument was placed at a position where the polar angle is 20° (θ in FIG. 2 is 20°) and the azimuthal angle is 315° (φ in FIG. 2 is 315°), and the brightness (brightness 20D) was obtained. Next, the four obtained brightnesses (brightness 20A, brightness 20B, brightness 20C, and brightness 20D) were arithmetically averaged to obtain an average brightness, which was designated as I20.

In addition, I40 was obtained as follows. First, the liquid crystal display device was brought into a white display state in a dark room, the measuring instrument was placed at a position where the polar angle is 40° (θ in FIG. 2 is 40°) and the azimuthal angle is 45° (φ in FIG. 2 is 45°), and then the brightness (brightness 40A) was obtained; the measuring instrument was placed at a position where the polar angle is 40° (θ in FIG. 2 is 40°) and the azimuthal angle is 135° (φ in FIG. 2 is 135°), and the brightness (brightness 40B) was obtained; the measuring instrument was placed at a position where the polar angle is 40° (θ in FIG. 2 is 40°) and the azimuthal angle is 225° (φ in FIG. 2 is 225°), and the brightness (brightness 40C) was obtained; and the measuring instrument was placed at a position where the polar angle is 40° (θ in FIG. 2 is 40°) and the azimuthal angle is 315° (φ in FIG. 2 is 315°), and the brightness (brightness 40D) was obtained. Next, the four obtained brightnesses (brightness 40A, brightness 40B, brightness 40C, and brightness 40D) were arithmetically averaged to obtain an average brightness, which was designated as I40.

In addition, I60 was obtained as follows. First, the liquid crystal display device was brought into a white display state in a dark room, the measuring instrument was placed at a position where the polar angle is 60° (θ in FIG. 2 is 60°) and the azimuthal angle is 45° (φ in FIG. 2 is 45°), and then the brightness (brightness 60A) was obtained; the measuring instrument was placed at a position where the polar angle is 60° (θ in FIG. 2 is 60°) and the azimuthal angle is 135° (φ in FIG. 2 is 135°), and the brightness (brightness 60B) was obtained; the measuring instrument was placed at a position where the polar angle is 60° (θ in FIG. 2 is 60°) and the azimuthal angle is 225° (φ in FIG. 2 is 225°), and the brightness (brightness 60C) was obtained; and the measuring instrument was placed at a position where the polar angle is 60° (θ in FIG. 2 is 60°) and the azimuthal angle is 315° (φ in FIG. 2 is 315°), and the brightness (brightness 60D) was obtained. Next, the four obtained brightnesses (brightness 60A, brightness 60B, brightness 60C, brightness 60D) were arithmetically averaged to obtain an average brightness, which was designated as I60.

<Evaluation of Display Quality>

The entire surface of the liquid crystal display device prepared in each of Examples and Comparative Examples was brought into a blue display state, the liquid crystal display device was observed from the front at a position 50 cm away from the liquid crystal display device, and the display quality was evaluated according to the following standards.

A: Excellent display quality (brightness, chroma saturation) is achieved on entire surface.

B: Slight deterioration in display quality is observed at end parts of screen, but it is not noticeable.

C: Deterioration in display quality at end parts of screen is noticeable.

<Evaluation of Halo>

Figure 7:
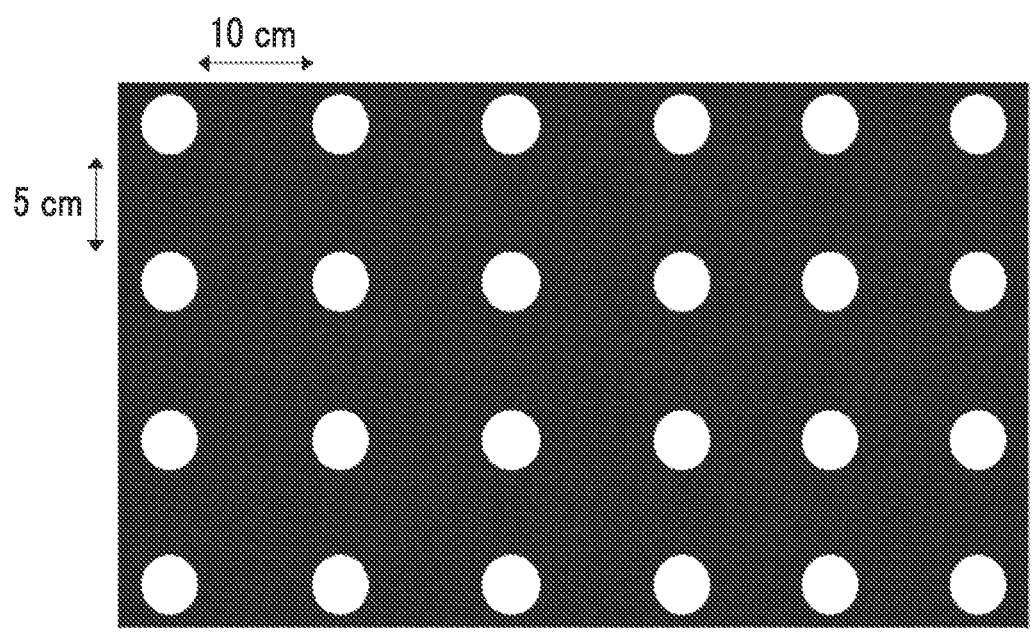
FIG. 7 is a schematic diagram of an image displayed by evaluation of halo.

In a case where an image in which white circles having a diameter of 5 cm were disposed at intervals of 10 cm was displayed on a black background as shown in FIG. 7 using the liquid crystal display device prepared in each of Examples and Comparative Examples, the liquid crystal display device was observed from the front at a position 50 cm away from the liquid crystal display device, and halos around the white display portions were observed and evaluated according to the following standards.

A: Halo is not visible.

B: Halo is visible, but it is not noticeable.

C: Halo is visible and it is noticeable.

In Table 1, the column of "Aspect" indicates which of the above-mentioned aspect 1 (aspect using a first optically anisotropic layer), aspect 2 (aspect using a light absorption anisotropic layer), and aspect 3 (aspect using a louver layer) corresponds. The "Aspect 1 and Aspect 2" corresponds to an aspect in which both the first optically anisotropic layer and the light absorption anisotropic layer were used.

In Table 1, the column of "Second optically anisotropic layer" indicates "A" in a case where the second optically anisotropic layer was used, and "B" in a case where the second optically anisotropic layer was not used.

In Table 1, the column of "Third optically anisotropic layer" indicates "A" in a case where the third optically anisotropic layer was used, and "B" in a case where the third optically anisotropic layer was not used.

TABLE 1

| | Aspect | Second optically anisotropic layer | Third optically anisotropic layer | (I20/I0) × 100 (%) | (I40/I0) × 100 (%) | (I60/I0) × 100 (%) | Evaluation of halo | Evaluation of display quality |
|---|---|---|---|---|---|---|---|---|
| Example 1 | Aspect 1 | B | B | 78 | 28 | 12 | B | B |
| Example 2 | Aspect 2 | B | B | 80 | 20 | 7 | B | B |
| Example 3 | Aspect 1 and Aspect 2 | B | B | 80 | 17 | 3 | A | B |
| Example 4 | Aspect 3 | B | B | 80 | 16 | 2 | A | B |
| Example 5 | Aspect 1 and Aspect 2 | A | B | 80 | 17 | 3 | A | A |
| Example 6 | Aspect 1 and Aspect 2 | B | A | 80 | 17 | 3 | A | A |
| Example 7 | Aspect 3 | A | B | 80 | 16 | 2 | A | A |
| Example 8 | Aspect 3 | B | A | 80 | 16 | 2 | A | A |
| Comparative Example 1 | — | — | — | 65 | 30 | 23 | C | C |
| Comparative Example 2 | — | — | — | 80 | 42 | 18 | C | C |
| Comparative Example 3 | — | — | — | 80 | 8 | 0 | A | C |

As shown in Table 1, it was confirmed that the liquid crystal display device according to the embodiment of the present invention exhibits a desired effect.

From the comparison of Example 3 with Example 5 and Example 6, it was confirmed that a more excellent effect was obtained in a case where the second optically anisotropic layer or the third optically anisotropic layer was used.

From the comparison of Example 1, Example 2, and Example 3, it was confirmed that a more excellent effect was obtained in a case where the louver layer was used.

From the comparison of Example 1 to Example 3, it was confirmed that a more excellent effect was obtained in a case where both the first optically anisotropic layer and the light absorption anisotropic layer were used.

EXPLANATION OF REFERENCES

10: liquid crystal display device
12: first polarizer
14: liquid crystal cell
16: second polarizer
18: light control member
20, 30: direct type backlight
22: upper substrate
24: lower substrate
26: liquid crystal layer
32: substrate
34: point light sources
40: louver layer
42: light transmission band
44: light shielding band
46: first transparent protective layer
48: second transparent protective layer

What is claimed is:

1. A liquid crystal display device comprising, in the following order:
   a first polarizer;
   a liquid crystal cell;
   a second polarizer; and
   a direct type backlight that uses a point light source,
   wherein a light control member is further provided between the second polarizer and the direct type backlight,
   the liquid crystal display device satisfies relationships of the following Expression (1) to Expression (3), $$70\% \leq (I20/I0) \times 100 \leq 90\% \quad \text{Expression (1)}$$

$$10\% \leq (I40/I0) \times 100 \leq 35\% \quad \text{Expression (2)}$$

$$1\% \leq (I60/I0) \times 100 \leq 20\% \quad \text{Expression (3)}$$

in a case where, upon expressing an azimuthal angle with setting an absorption axis direction of the first polarizer to an azimuthal angle of 0°, counterclockwise rotation with reference to the absorption axis direction of the first polarizer as viewed from a viewing side is represented by a positive value,
   I0 represents a brightness measured at a polar angle of 0° and an azimuthal angle of 0° in a state of the liquid crystal display device being brought into white display,
   I20 represents an average brightness obtained by arithmetically averaging a brightness measured at a polar angle of 20° and an azimuthal angle of 45°, a brightness measured at a polar angle of 20° and an azimuthal angle of 135°, a brightness measured at a polar angle of 20° and an azimuthal angle of 225°, and a brightness measured at a polar angle of 20° and an azimuthal angle of 315°, in a state of the liquid crystal display device being brought into white display,
   I40 represents an average brightness obtained by arithmetically averaging a brightness measured at a polar angle of 40° and an azimuthal angle of 45°, a brightness measured at a polar angle of 40° and an azimuthal angle of 135°, a brightness measured at a polar angle of 40° and an azimuthal angle of 225°, and a brightness measured at a polar angle of 40° and an azimuthal angle of 315°, in a state of the liquid crystal display device being brought into white display, and
   I60 represents an average brightness obtained by arithmetically averaging a brightness measured at a polar angle of 60° and an azimuthal angle of 45°, a brightness measured at a polar angle of 60° and an azimuthal angle of 135°, a brightness measured at a polar angle of 60° and an azimuthal angle of 225°, and a brightness measured at a polar angle of 60° and an azimuthal angle of 315°, in a state of the liquid crystal display device being brought into white display.

2. The liquid crystal display device according to claim 1, wherein the light control member has a first optically anisotropic layer that satisfies relationships of Expression (4) to Expression (6), $$0 \text{ nm} \leq Re1(550) \leq 300 \text{ nm} \quad \text{Expression (4)}$$

$$100 \text{ nm} \leq |Rth1(550)| \leq 1000 \text{ nm} \quad \text{Expression (5)}$$

$$|Nz| \geq 1.2 \quad \text{Expression (6)}$$

Re1(550) represents an in-plane retardation of the first optically anisotropic layer at a wavelength of 550 nm, Rth1(550) represents a thickness direction retardation of the first optically anisotropic layer at a wavelength of 550 nm, and Nz represents an Nz factor of the first optically anisotropic layer.

3. The liquid crystal display device according to claim 1, wherein the light control member has a light absorption anisotropic layer containing a dichroic substance, and in a case where a direction having a highest transmittance with respect to a surface of the light absorption anisotropic layer is defined as a transmission axis, an angle formed by a normal direction of the light absorption anisotropic layer and the transmission axis is 0° to 45°.

4. The liquid crystal display device according to claim 1, wherein the light control member has a louver layer in which light transmission bands and light shielding bands are alternately and repeatedly disposed.

5. The liquid crystal display device according to claim 1, wherein a second optically anisotropic layer including a positive A plate satisfying relationships of Expression (7) and Expression (8) and a positive C plate satisfying relationships of Expression (9) and Expression (10) is provided in at least between the first polarizer and the liquid crystal cell or at least between the second polarizer and the liquid crystal cell, $$80 \text{ nm} \leq ReA(550) \leq 160 \text{ nm} \quad \text{Expression (7)}$$

$$0.75 < ReA(450)/ReA(550) < 1.00 \quad \text{Expression (8)}$$

$$-160 \text{ nm} \leq RthC(550) \leq -60 \text{ nm} \quad \text{Expression (9)}$$

$$0.75 < RthC(450)/RthC(550) < 1.00 \quad \text{Expression (10)}$$

ReA(550) represents an in-plane retardation of the positive A plate at a wavelength of 550 nm, ReA(450) represents an in-plane retardation of the positive A plate at a wavelength of 450 nm, RthC(550) represents a thickness direction retardation of the positive C plate at a wavelength of 550 nm, and RthC(450) represents a thickness direction retardation of the positive C plate at a wavelength of 450 nm.

6. The liquid crystal display device according to claim 1, wherein a third optically anisotropic layer satisfying relationships of Expression (11) and Expression (12) is provided in at least between the first polarizer and the liquid crystal cell or at least between the second polarizer and the liquid crystal cell, $$200 \text{ nm} \leq Re3(550) \leq 400 \text{ nm} \quad \text{Expression (11)}$$

$$0 \text{ nm} \leq |Rth3(550)| \leq 50 \text{ nm} \quad \text{Expression (12)}$$

Re3(550) represents an in-plane retardation of the third optically anisotropic layer at a wavelength of 550 nm, and Rth3(550) represents a thickness direction retardation of the third optically anisotropic layer at a wavelength of 550 nm.

7. The liquid crystal display device according to claim 2, wherein the light control member has a light absorption anisotropic layer containing a dichroic substance, and in a case where a direction having a highest transmittance with respect to a surface of the light absorption anisotropic layer is defined as a transmission axis, an angle formed by a normal direction of the light absorption anisotropic layer and the transmission axis is 0° to 45°.

8. The liquid crystal display device according to claim 2, wherein the light control member has a louver layer in which light transmission bands and light shielding bands are alternately and repeatedly disposed.

9. The liquid crystal display device according to claim 2, wherein a second optically anisotropic layer including a positive A plate satisfying relationships of Expression (7) and Expression (8) and a positive C plate satisfying relationships of Expression (9) and Expression (10) is provided in at least between the first polarizer and the liquid crystal cell or at least between the second polarizer and the liquid crystal cell, $$80 \text{ nm} \leq ReA(550) \leq 160 \text{ nm} \quad \text{Expression (7)}$$

$$0.75 < ReA(450)/ReA(550) < 1.00 \quad \text{Expression (8)}$$

$$-160 \text{ nm} \leq RthC(550) \leq -60 \text{ nm} \quad \text{Expression (9)}$$

$$0.75 < RthC(450)/RthC(550) < 1.00 \quad \text{Expression (10)}$$

ReA(550) represents an in-plane retardation of the positive A plate at a wavelength of 550 nm, ReA(450) represents an in-plane retardation of the positive A plate at a wavelength of 450 nm, RthC(550) represents a thickness direction retardation of the positive C plate at a wavelength of 550 nm, and RthC(450) represents a thickness direction retardation of the positive C plate at a wavelength of 450 nm.

10. The liquid crystal display device according to claim 2, wherein a third optically anisotropic layer satisfying relationships of Expression (11) and Expression (12) is provided in at least between the first polarizer and the liquid crystal cell or at least between the second polarizer and the liquid crystal cell, $$200 \text{ nm} \leq Re3(550) \leq 400 \text{ nm} \quad \text{Expression (11)}$$

$$0 \text{ nm} \leq |Rth3(550)| \leq 50 \text{ nm} \quad \text{Expression (12)}$$

Re3(550) represents an in-plane retardation of the third optically anisotropic layer at a wavelength of 550 nm, and Rth3(550) represents a thickness direction retardation of the third optically anisotropic layer at a wavelength of 550 nm.

11. The liquid crystal display device according to claim 3, wherein the light control member has a louver layer in which light transmission bands and light shielding bands are alternately and repeatedly disposed.

12. The liquid crystal display device according to claim 3, wherein a second optically anisotropic layer including a positive A plate satisfying relationships of Expression (7) and Expression (8) and a positive C plate satisfying relationships of Expression (9) and Expression (10) is provided in at least between the first polarizer and the liquid crystal cell or at least between the second polarizer and the liquid crystal cell, $$80 \text{ nm} \leq ReA(550) \leq 160 \text{ nm} \quad \text{Expression (7)}$$

$$0.75 < ReA(450)/ReA(550) < 1.00 \quad \text{Expression (8)}$$

$-160\ \text{nm} \leq RthC(550) \leq -60\ \text{nm}$      Expression (9)

$0.75 < RthC(450)/RthC(550) < 1.00$      Expression (10)

ReA(550) represents an in-plane retardation of the positive A plate at a wavelength of 550 nm, ReA(450) represents an in-plane retardation of the positive A plate at a wavelength of 450 nm, RthC(550) represents a thickness direction retardation of the positive C plate at a wavelength of 550 nm, and RthC(450) represents a thickness direction retardation of the positive C plate at a wavelength of 450 nm.

13. The liquid crystal display device according to claim 3, wherein a third optically anisotropic layer satisfying relationships of Expression (11) and Expression (12) is provided in at least between the first polarizer and the liquid crystal cell or at least between the second polarizer and the liquid crystal cell, $200\ \text{nm} \leq Re3(550) \leq 400\ \text{nm}$      Expression (11)

$0\ \text{nm} \leq |Rth3(550)| \leq 50\ \text{nm}$      Expression (12)

Re3(550) represents an in-plane retardation of the third optically anisotropic layer at a wavelength of 550 nm, and Rth3(550) represents a thickness direction retardation of the third optically anisotropic layer at a wavelength of 550 nm.

14. The liquid crystal display device according to claim 4, wherein a second optically anisotropic layer including a positive A plate satisfying relationships of Expression (7) and Expression (8) and a positive C plate satisfying relationships of Expression (9) and Expression (10) is provided in at least between the first polarizer and the liquid crystal cell or at least between the second polarizer and the liquid crystal cell, $80\ \text{nm} \leq ReA(550) \leq 160\ \text{nm}$      Expression (7)

$0.75 < ReA(450)/ReA(550) < 1.00$      Expression (8)

$-160\ \text{nm} \leq RthC(550) \leq -60\ \text{nm}$      Expression (9)

$0.75 < RthC(450)/RthC(550) < 1.00$      Expression (10)

ReA(550) represents an in-plane retardation of the positive A plate at a wavelength of 550 nm, ReA(450) represents an in-plane retardation of the positive A plate at a wavelength of 450 nm, RthC(550) represents a thickness direction retardation of the positive C plate at a wavelength of 550 nm, and RthC(450) represents a thickness direction retardation of the positive C plate at a wavelength of 450 nm.

15. The liquid crystal display device according to claim 4, wherein a third optically anisotropic layer satisfying relationships of Expression (11) and Expression (12) is provided in at least between the first polarizer and the liquid crystal cell or at least between the second polarizer and the liquid crystal cell, $200\ \text{nm} \leq Re3(550) \leq 400\ \text{nm}$      Expression (11)

$0\ \text{nm} \leq |Rth3(550)| \leq 50\ \text{nm}$      Expression (12)

Re3(550) represents an in-plane retardation of the third optically anisotropic layer at a wavelength of 550 nm, and Rth3(550) represents a thickness direction retardation of the third optically anisotropic layer at a wavelength of 550 nm.

16. The liquid crystal display device according to claim 5, wherein a third optically anisotropic layer satisfying relationships of Expression (11) and Expression (12) is provided in at least between the first polarizer and the liquid crystal cell or at least between the second polarizer and the liquid crystal cell, $200\ \text{nm} \leq Re3(550) \leq 400\ \text{nm}$      Expression (11)

$0\ \text{nm} \leq |Rth3(550)| \leq 50\ \text{nm}$      Expression (12)

Re3(550) represents an in-plane retardation of the third optically anisotropic layer at a wavelength of 550 nm, and Rth3(550) represents a thickness direction retardation of the third optically anisotropic layer at a wavelength of 550 nm.

\* \* \* \* \*